Sept. 1, 1959  C. BROCKMAN  2,902,557
PRESSURE-RESPONSIVE SWITCHES
Filed July 11, 1956  2 Sheets-Sheet 1

INVENTOR.
CARL BROCKMAN
BY *J. D. O'Brien*
*V. C. Muller*
ATTORNEYS

Sept. 1, 1959 C. BROCKMAN 2,902,557
PRESSURE-RESPONSIVE SWITCHES
Filed July 11, 1956 2 Sheets-Sheet 2

INVENTOR.
CARL BROCKMAN
BY
ATTORNEYS

United States Patent Office 2,902,557
Patented Sept. 1, 1959

2,902,557

PRESSURE-RESPONSIVE SWITCHES

Carl Brockman, West Middlesex, Pa., assignor, by mesne assignments, to the United States of America as represented by the Secretary of the Navy Application July 11, 1956, Serial No. 597,314

1 Claim. (Cl. 200—82)

This invention relates to underwater equipment, and more particular to electrical switch devices adapted to control such equipment in response to sensing predetermined hydrostatic pressures.

The pressure-responsive switch device here under consideration is of special utility in connection with underwater ordnance equipment, particularly electrically controlled torpedoes which must have self-controlling action in response to hydrostatic pressure corresponding to a pre-selected depth, and in which such switches must satisfy stringent requirements as to ability to withstand vibration, launching shocks, water entry impacts, and hydrostatic pressures greatly in excess of normal switching-actuation pressures.

Since it serves to clearly illustrate the manner of use and salient features of the present invention, an exemplary pressure-responsive switch device will be shown and described with particular reference to such underwater ordnance equipment.

Modern anti-ship and anti-submarine torpedoes sometimes employ circuit-controlling pressure-responsive electrical switches in such manner that their actuation, prior to submergence of the torpedo to the desired switch-control depth, would result in torpedo malfunctions. These torpedoes, and component devices therein, often experience short-duration but comparatively large accelerations, for example when the torpedo is launched by catapulting or by other forceful means. As will be readily understood, therefore, premature switch-actuation and resultant malfunctions are often encountered when commercially available pressure switches are employed. Such switches are especially prone to premature actuation, under acceleration conditions, when they are designed for normal actuation at relatively low hydrostatic pressures. Where difficulties of this nature are anticipated, it has heretofore been necessary to resort to relatively complex expedients or circuit arrangements to avoid the effects of such pressure-switch shortcomings or failures.

It is therefore one of the principal objects of the present invention to provide a pressure-responsive switch device having improved actuation-resistance to shock accelerations.

It is another object of the invention to provide a pressure-responsive switch device which can be relied upon to operate at a predetermined relatively low hydrostatic pressure, yet immune to actuation by relatively large accelerations.

It is another object of the invention to provide an improved pressure-responsive torpedo switch assembly adapted to withstand normal launching-shocks and water-entry impacts.

It is a further object of the invention to provide such a pressure-responsive switch device which is very effective yet simple in construction and relatively inexpensive in manufacture.

Other objects and many of the attendant advantages of this invention will be readily appreciated as the same becomes better understood by reference to the following detailed description when considered in connection with the accompanying drawings wherein.

Figure 1:
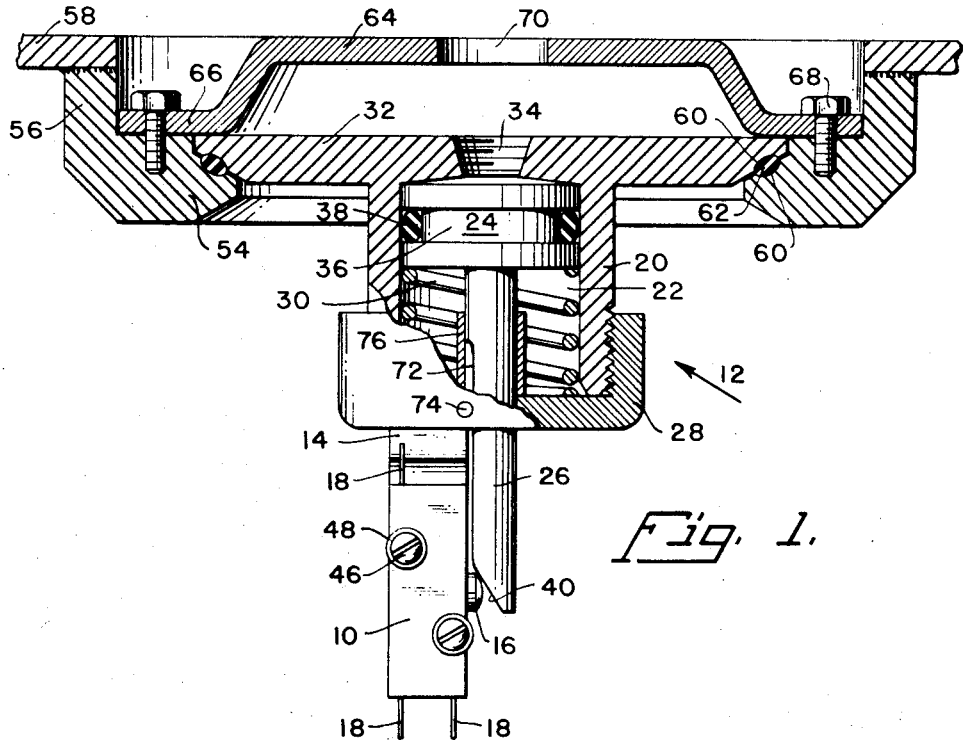
Fig. 1 illustrates one embodiment of the invention, adapted for torpedo use, and shown largely in cross-section to better illustrate internal structure.
Figure 2:
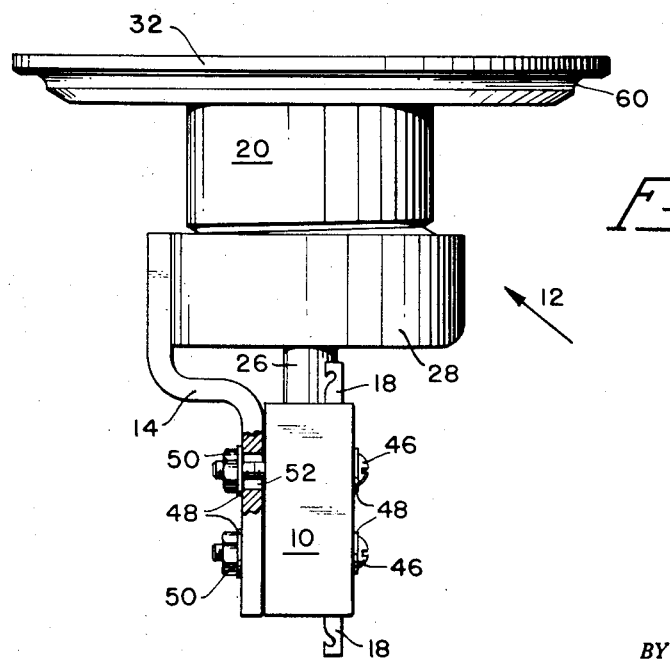
Fig. 2 is an external side view of the pressure-responsive switch device shown in Fig. 1.

Referring now to Figs. 1 and 2 which illustrate one form of the pressure-responsive torpedo switch device, the switch per se is a compact unit as shown at 10, mounted in fixed position relative to a pressure-responsive unit 12 by means of a bracket member 14, but adjustable to a small extent by means later described. Switch unit 10 itself may be of conventional over-center snap-action type, having an automatic-return push-button 16 for switch actuation. Such switches are commercially available in various forms, here shown as of single-pole double-throw type as indicated by three connection terminals 18 which protrude from a molded plastic case enclosing the internal switch structure. For the switch unit orientation shown in Fig. 1, switch-actuation would be obtained by depression of push-button 16 toward the left.

The pressure-responsive unit 12 which coacts with the switch unit 10 comprises a body member 20 having a cylindrical bore 22 formed therein, in which is slidably mounted a spring-biased piston 24 having a plunger 26 extending therefrom for actuation of the switch unit 10, and a cap member 28 threadedly secured to body member 20 and serving to compress and confine the biasing coil-spring 30 within the body member 20. Cap member 28 also serves to guide the plunger 26, and to restrain it from rotational displacement relative to push-button 16 of the switch unit, as will be later explained.

Formed integrally with the upper part of body member 20 is a circular cover plate 32, which serves as means for mounting and sealing the pressure-responsive switch device in an access handhole of a torpedo, as illustrated in Fig. 1 and later described. A central opening 34 provided in body member 20 above piston 24 permits sea-water to enter and exert pressure against the piston, and this opening may be pipe-threaded as indicated to accommodate connection of external calibration test equipment. Annular groove 36 in piston 24 accommodates O-ring gasket 38, the dimensions of the O-ring gasket and the accepting groove being made suitable to permit nearly-free sliding action of piston 24 while still preventing seepage of sea-water between the piston and cylinder wall.

The bracket member 14 which supports switch unit 10 may be secured to cap member 28 by soldering, brazing, or any other suitable technique. The particular switch unit here shown is clamped to bracket member 14 by means of machine screws 46 and the associated washers 48 and nuts 50, screws 46 extending through apertures provided in the molded switch unit casing and through the apertures 52 provided in bracket member 14. The bracket member apertures 52 are elongated in the direction of plunger movement, enabling some adjustment of the relative position of the switch unit 10 in order to secure its normal actuation exactly at a pre-selected sea-water depth.

As previously indicated, the circular cover plate 32 formed integrally with body member 20 of the pressure-responsive unit 12 enables the pressure-switch assembly to be mounted in a torpedo access handhole, as illustrated in Fig. 1. The outermost lower face portion of circular cover plate 32 is conformably beveled to fit against the annular shoulder 54 of a well member 56, the latter being hermetically secured, as by welding, interiorly of the torpedo shell 58 and in registry with an access handhole formed therein. The abutting surfaces of cover plate 32 and shoulder 54 are provided with registering grooves 60 which accommodate an O-ring gasket 62. With the O-ring gasket 62 in place, cover plate 32 of the pressure-responsive switch device is clamped against the annular shoulder 54 of well member 56 by means of an access handhole cover 64, the latter having a rim flange 66 which may be secured to well member 56 by means of socket-head bolts 68, as shown. A central opening 70 in access handhole cover 64 permits entry of sea-water to the pressure-responsive unit 12, O-ring gasket 62 providing a hermetic seal between the cover plate 32 and the abutting shoulder of well member 56, the sea-water exerting hydrostatic pressure against piston 24 but prevented by O-ring gasket 38 from seeping past the piston 24.

Plunger 26 may be rounded at its switch-actuating end 40, or preferably tapered as shown, to provide a wedge force action against the switch push-button 16 at an angle to the line of plunger displacement. Switch 10 is so mounted in relation to the tapered free end 40 of plunger 26 that push-button 16 will be depressed and cause switch actuation upon sufficient displacement of piston 24, designed to occur at a pre-selected depth. The tapered end configuration of plunger 26 and the illustrated orientation of switch unit 10 are so provided in order that the axes along which they individually have least immunity to shock accelerations shall extend at right angles to each other rather than in the same direction, in order to avoid additive effects which would deteriorate the shock-acceleration resistance of the entire assembly.

As previously indicated, means are provided to restrain plunger 26 from angular displacement, in order that the facing attitude of tapered end 40 of plunger 26 relative to push-button 16 shall remain invariable. As in the illustrated embodiment, this may be accomplished by milling or cutting away a longitudinal section of plunger 26 extending upwardly from its tapered end to form a plane surface 72, and by press-fitting a guide rod 74 into an accommodating bore formed transversely in the bottom wall of cap member 28 and in tangency to plane surface 72. Plunger 26 is thus permitted no freedom to turn, and its movement is correspondingly confined to translational displacements.

There is also provided means for preventing excessive compression of coil spring 30, as would occur at torpedo operating depths beyond that at which switch-actuation is desired. A tubular stop member 76 is employed in this instance, loosely surrounding plunger 26 within cylindrical bore 22 but of a length slightly shorter than the maximum longitudinal displacement required of piston 24 for switch actuation. This piston-displacement limiting means is of practical importance in maintaining constancy of spring characteristics and correspondingly of the pressure-actuation calibration of the torpedo switch device.

Referring again to Fig. 1 in particular, the coil spring 30 is confined under compression within cylindrical bore 22 to provide a biasing force upon piston 24 in a direction opposing that required for actuation of switch 10. The spring constant, spring compression, and piston area are so chosen and related as to provide a balance between (*a*) the biasing force and (*b*) the force exerted upon the piston face when the torpedo is submerged to a depth somewhat less than that at which the desired torpedo controlling action must take place. In normal operation, therefore, piston 24 will experience an increasing hydrostatic pressure as the torpedo depth increases, but no piston movement will occur until the torpedo is nearly at the desired operating depth. Further increase in depth will cause corresponding piston displacement until, at the predetermined switch-actuation pressure, downward movement of plunger 26 has become sufficient to actuate switch 10 and cause changeover of the switch condition. Much the same sort of operation, of course, takes place in reverse as the torpedo approaches the switch-actuation pressure from a greater depth.

Considerable immunity against switch actuation because of acceleration conditions, such as induced by torpedo launching shock, is provided by reducing the weight of those switch device components which tend to be displaced, increasing the ratio of the initial spring compression force to the mass of the displaceable components. Piston 24 and its plunger 26 may be made relatively light by suitable dimensioning and by fabrication of low-density but structurally satisfactory material, either metal or plastic. Where necessary, essentially tubular or hollowed configurations may be employed for further weight reduction. By such means, then, the total weight of the piston and plunger may be reduced to a desired minimum so that the forces developed therein will likewise be of low order, even for shock accelerations of large magnitude. Piston 24 will then not even begin to move until a shock acceleration of such magnitude is reached as to result in development of a piston force large enough to overcome the initial compressional force of the spring.

It will now be understood, also, that the initial spring compression force in the pressure-responsive switch device here described is a function of both the desired switch-actuation depth and of the face area of piston 24, and that by suitable design the ratio of the initial piston-biasing force to the mass of the displaceable components can thus easily be increased to an extent sufficient to meet and exceed the expected acceleration magnitudes.

While the switch device shown in Figs. 1 and 2 provide greatly improved switch-actuation resistance to shock-induced accelerations by reason of its novel structure as detailed above, and this embodiment is therefore very satisfactory under normally-encountered conditions, switch actuation may nevertheless occur when switch unit 10 is subjected to unusually large lateral accelerations acting in a direction to depress push button 16.

Figure 3:
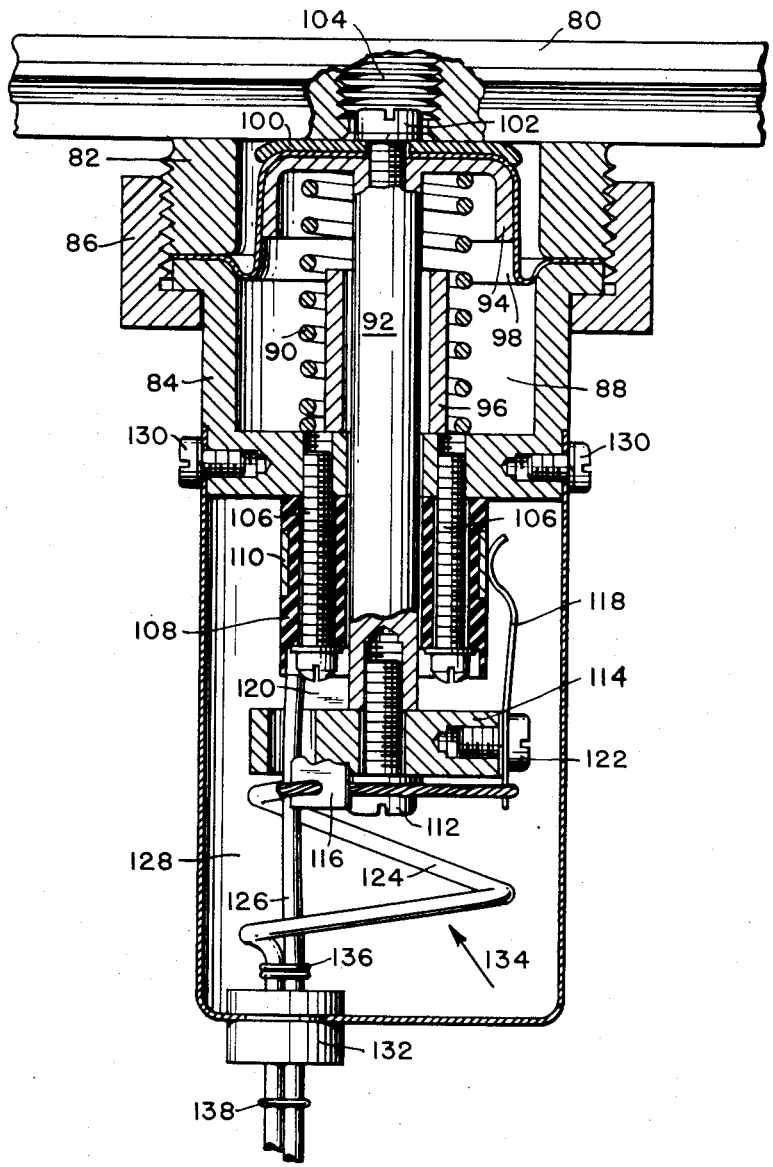
Fig. 3 illustrates another embodiment of the invention, providing immunity from switch-actuation by lateral accelerations.

The embodiment illustrated in Fig. 3 eliminates the possibility of undesired circuit-switching due to such lateral accelerations by employing several switches or switch units circumferentially spaced about the plunger and paralleled electrically. The switch device shown in Fig. 3 is otherwise of basically the same structure as to the cover plate, plunger and coil spring arrangement as has been described with reference to Figs. 1 and 2. Cover plate 80 is here shown fragmentarily, and it is to be understood that its peripheral configuration may be substantially as shown in Fig. 2 so that it may be mounted in the same manner. Exteriorly-threaded cylindrical flange 82 depending from the cover plate is secured to axially-aligned cup-shaped body member 84 by means of clamping ring 86 as shown, thus defining a cylindrical bore 88 to accommodate the spring 90, plunger 92, piston 94, and stop member 96. The bottom wall of body member 84 is suitably bored to accommodate sliding movements of plunger 92. The plunger carries at its upper end the inverted cup-shaped piston 94 which is of considerably smaller diameter than cylindrical bore 88. A flexible diaphragm 98, having its central portion clamped between the upper face of piston 94 and a conformably-shaped disc 100 by means of screw 102, and having its peripheral portion clamped between the abutting ends of cylindrical flange 82 and body member 84, serves to seal the underside of piston 94 from the sea-water pressure communicated to the switch device through inlet 104. Friction inherent to the arrangement shown in Fig. 1 is thus reduced to a minimum, correspondingly reducing the switch device hysteresis, the difference between sea-water depths at which opening and closing or switch-actuation reversal occurs. Secured to the underside of body member 84 by means of screws 106, and likewise suitably bored to accommodate sliding movements of plunger 92, is an axially aligned cylindrical boss 108 made of insulating material and carrying one or more conductive rings 110 which serve as stationary contact members. Mounted upon the lower end of plunger 92 by means of screw 112 is a supporting plate 114 to which are secured three leaf-spring elements 116, 118 and 120 by means of screws 122. The leaf-spring elements make sliding contact against conductive ring 110 and therefore together therewith form three switch units, wired in parallel as will appear. The sliding contact elements are spaced at 120° intervals about the axis of the assembly, contact element 120 lying behind contact element 116 in Fig. 3. Conductor 124 is electrically connected to contact elements 116, 118 and 120, and connection to the single ring 110 is made via conductor 126, these conductors for convenience here being shown fragmented at their lower ends but to be understood as usually terminating in a connector or directly wired to a utilization circuit. The lower portion of the assembly is protected by means of a cover member 128, secured by screws 130 to body member 84, the lower end of the cover member having a hole therein to pass the conductors 124, 126 protected by grommet 132. Since conductor 124 is subject to displacement during operation of the switch device, loop 134 is provided as shown between contact element 116 and the point at which the conductors are tied by lacing 136 just above grommet 132. Lacings 136 and 138 may of course be sufficiently bulky to prevent accidental excessive slippage of the conductors through the grommet after assembly.

The basic design of the switch device shown in Fig. 3, and its operation, are essentially the same as has been described in connection with the embodiment shown in Figs. 1 and 2, except as to the switch arrangement. While the first-described embodiment employs a single switch unit 10 of over-center snap-action type which, as has been shown, is actuated by plunger movement but can also be actuated by excessive lateral accelerations, the embodiment illustrated in Fig. 3 employs several switches which are connected in parallel and distributed about the plunger so that at least one remains in engagement against a conductive ring no matter how large the lateral acceleration may be.

Supporting plate 114 or other members of the switch device may of course be fabricated of insulating material where it is desired to insure that the sliding contact elements remain well-isolated from cover plate 80 or other structure connected thereto. Also, while but one conductive ring and but one set of sliding contacts have been shown, multi-pole multi-throw switch action is easily obtained simply by providing adjacent conductive rings and additional sets of leaf-spring elements, and suitable connections thereto.

The switch device illustrated in Fig. 3 is of course not limited to use of slip-ring structure as shown but may employ other type switches. Similarly, the switch device shown in Fig. 1 can readily be modified to provide complete immunity against shock-induced lateral accelerations by employing several paralleled switch units of the same or other type, circumferentially spaced as above described, and operated by a plunger suitably modified to actuate these switch units.

Obviously many other modifications and variations are possible in the light of the above teachings without departing from basic concepts of the present invention. It is therefore to be understood that within the scope of the appended claim the invention may be practiced otherwise than as specifically described.

What is claimed is:

An electrical switch device for use in underwater equipment, comprising: a pressure-responsive unit having spring-restrained piston means which is displaceable along a reference axis in response only to hydrostatic pressures exceeding a predetermined minimum value substantially equal to that at which switch actuation must occur, at least three switch means spaced circumferentially about said reference axis and arranged to be actuated in unison by displacement of said piston means, and means connecting said several switch means in parallel, said switch device thereby having substantial immunity to shock-induced forces acting in any direction thereon.

References Cited in the file of this patent

UNITED STATES PATENTS

| | | |
|---|---|---|
| 1,593,222 | Russell | July 20, 1926 |
| 1,774,801 | Macke et al. | Sept. 2, 1930 |
| 1,960,662 | Como et al. | May 29, 1934 |
| 2,058,553 | Beiderman | Oct. 27, 1936 |
| 2,418,508 | Goepfrick | Apr. 8, 1947 |
| 2,435,143 | Knauth | Jan. 27, 1948 |
| 2,472,984 | Olson | June 14, 1949 |
| 2,492,261 | Bordelon | Dec. 27, 1949 |
| 2,721,913 | Kent, Jr. | Oct. 25, 1955 |